UNITED STATES PATENT OFFICE.

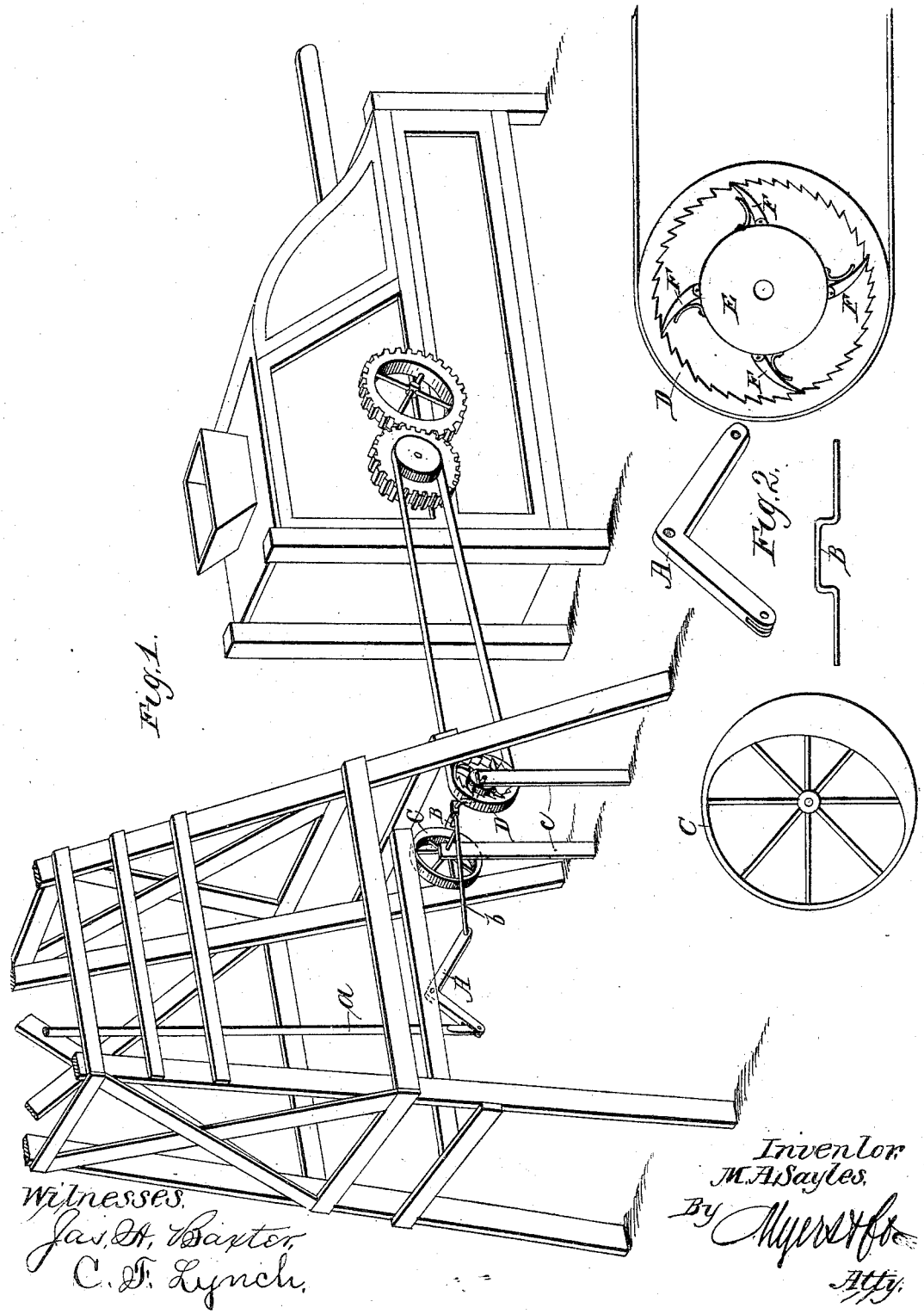

MYRON A. SAYLES, OF WICHITA, KANSAS.

DEVICE FOR CONVERTING MOTION.

SPECIFICATION forming part of Letters Patent No. 271,132, dated January 23, 1883.

Application filed July 7, 1882. (No model.)

*To all whom it may concern:*

Be it known that I, MYRON A. SAYLES, a citizen of the United States, residing at Wichita, in the county of Sedgwick and State of Kansas, have invented certain new and useful Improvements in Windmill Mechanism for Converting Motion; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to improvements in mechanism for converting motion, more especially for converting the reciprocating motion of a windmill shaft or pitman into a rotary motion, to utilize its power or movement in operating or running machinery—as, for instance, in operating a corn-sheller, a thrashing-machine, a grain-separator, and so on.

The nature of this invention consists, therefore, in the application to the shaft or pitman of a windmill of a bell-crank or angular lever suitably connected to a crank-shaft having a fly or balance wheel and a belt or band pulley connected by an inner ratchet-wheel to its shaft, substantially as hereinafter more fully set forth.

In the accompanying drawings, Figure 1 is a view showing my improvement as applied for use to a windmill shaft or pitman for operating a corn-sheller. Fig. 2 is a detail view of the belt or band pulley, showing its component parts.

To carry out my invention I employ a bell-crank or angular lever, A, which is hung at its elbow or apex to a cross-piece or other convenient point on the windmill-tower, as clearly shown, contiguous to the pitman or pump-rod $a$. It has one end connected to the pitman-shaft or pump-rod, as the case may be, while its other end is connected by a rod or pitman, $b$, to a crank-shaft, B. The shaft B is suitably hung in an upright frame, $c$, or other suitable support. Upon this shaft is so arranged a balance or fly wheel, C, by means of set-screws passed through its hub and entering a slot or groove in the shaft, that when subjected to a concussion or jerking action from any cause it will free itself from its fixed position and turn independently of the shaft. Upon this same shaft is also journaled the drive or band pulley D, around which is passed a belt or band extended to a pulley on the shaft of one of the corn-sheller gear-wheels or a pulley on the gearing-shaft of other machinery it may be desired to operate. This pulley is connected to or sleeved loosely upon the crank-shaft, so that it may turn independently of the said shaft should it be checked by reason of an unsteady or disjointed movement of the windmill pitman or rod when running at high speed, to prevent it interfering with the action of the shaft and the other operative mechanism or machinery. The pulley, under other circumstances, is caused to drive the shaft by means of a ratchet wheel or disk, E, fixed to the shaft, and engaged by pawls F, hung upon the inner circumference of an annular rim or flange of the pulley. The pawls are acted upon by springs to hold them in engagement with the ratchet-wheel when the pulley is not acted upon, so as to check or reverse its movement, as above indicated. The balance-wheel to enable it to overcome dead-center, which takes place during the downward stroke of the windmill pitman or rod, is heavier on one side than the other.

I claim and desire to secure by Letters Patent—

The appliance for converting a reciprocating motion into a rotary motion, consisting of the bell-crank or angular lever, its pitman or rod, and the crank-shaft, having the band-pulley loosely sleeved thereon and provided with spring or gravity pawls, and the ratchet fixed to said shaft and engaged by said pawls, substantially as and for the purpose set forth.

In testimony whereof I affix my signature in presence of two witnesses.

MYRON A. SAYLES.

Witnesses:
N. F. NIEDERLANDER,
O. C. DAISY.